INVENTOR.
Raymond W. Allen
BY
Robert L. Spencer
ATTORNEY

United States Patent Office 3,429,192
Patented Feb. 25, 1969

3,429,192
ACCESSORY DRIVE
Raymond W. Allen, Indianapolis, Ind., assignor to General Motors Corporation, Detroit, Mich., a corporation of Delaware
Filed Nov. 10, 1966, Ser. No. 593,576
U.S. Cl. 74—217                                5 Claims
Int. Cl. F16h 9/00; F16d 27/08; F25b 27/00

ABSTRACT OF THE DISCLOSURE

A two-speed accessory drive for an engine driven accessory wherein the accessory is driven at relatively high speeds of rotation relative to engine speed in the low speed range of engine speed and at relatively low speeds relative to engine speed at relatively high engine speeds.

---

This invention relates to an improved accessory drive and more particularly to a simple compact multiple speed accessory drive for use in an automotive vehicle. The invention is particularly useful as a multiple speed drive for a compressor in an air conditioned automotive vehicle but may also be employed in connection with other engine driven accessories such as, for example, a generator or engine cooling fan.

The compressor for an air-conditioning unit in an automotive vehicle is commonly driven by the vehicle engine through a pulley belt drive structure at a fixed ratio with respect to engine speed. In the operation of a vehicle throughout its speed range it is common practice that the engine speed may vary from a speed of approximately 500 r.p.m. at idle to a speed of approximately 4000 r.p.m. maximum speed. Due to this wide speed range of engine operation it is very difficult to design a compressor which will properly handle the load conditions. The compressor output will be at a minimum at slow or idle speeds and maximum at high speeds. The capacity at low speeds may be inadequate to properly cool the vehicle, while at high speeds the compressor may provide excessive cooling. The high speeds of rotation of the compressor taxes the compressor reliability and endurance and results in unnecessary excessive fuel consumption on the part of the engine.

In conventional automotive air-condition drives it is common practice to drive the compressor by means of a belt-pulley arrangement wherein the engine crankshaft pulley comprises a seven inch diameter sheave and the compressor pulley is a six inch sheave. These diameters are dictated by the compressor requirements at low engine speed for adequate cooling at idle or slow speed operation. With such an arrangement, the relationship between engine speed and compressor speed is shown in the following table

| Engine r.p.m. | Compressor r.p.m. |
|---|---|
| 500 | 583 |
| 1000 | 1166 |
| 2000 | 2333 |
| 4000 | 4666 |

It will be apparent that improved performance, longer compressor life, and fuel economy savings will result by driving the compressor at higher speeds relative to engine r.p.m. in the low end of the range of engine speed and by driving the compressor at lower speeds relative to engine r.p.m. in the upper portion of the range of engine speed.

Accordingly, an object of this invention is to provide a two-speed accessory drive for an engine driven accessory wherein the accessory is driven at relatively high speeds of rotation relative to engine speed in the low speed range of engine speed and at relatively low speeds relative to engine speed at relatively high engine speeds.

Another object of this invention is to provide a drive for an engine-driven accessory through a pair of engine crankshaft driven pulleys and a pair of accessory drive pulleys operatively connected to the crankshaft driven pulleys wherein the accessory drive pulleys may be alternately clutched to the driven accessory to change the speed of rotation of the accessory relative to engine speed.

A further object of this invention is to provide in a drive of the type described a double-ended magnetic clutch for alternately connecting the driven accessories to the accessory drive pulleys.

An additonal object of this invention is to provide in an accessory drive of the type described an engine-driven governor effective to control the double-ended clutch to automatically release one of the accessory drive pulleys and engage the other of the accessory drive pulleys in response to change of engine speed.

A more specific object of this invention is to provide an accessory drive wherein the accessory may alternately be driven through pulleys arranged axially at opposite ends of a clutch housing for axial motion relative to the housing and responsive to electromagnetic coils carried by the clutch housing adjacent the pulleys respectively, wherein the coils when energized move the pulley adjacent its actuator coil into friction contact with the clutch housing.

An additional object of this invention is to provide an accessory housing having an axially extending boss thereon, a clutch housing having an axially extending boss thereon, pulleys mounted on said bosses such that the clutch housing is disposed intermediate said pulleys and fixed for rotation with an accessory drive shaft together with electromagnetic coils at opposite ends of the clutch housing effective when energized to move the pulleys axially on the bosses into friction control with the housing for driving the housing and accessory drive shaft.

These and other objects of this invention will be apparent from the following description and claims taken in conjunction with the accompanying drawings, in which:

Figures 1, 2, 3:
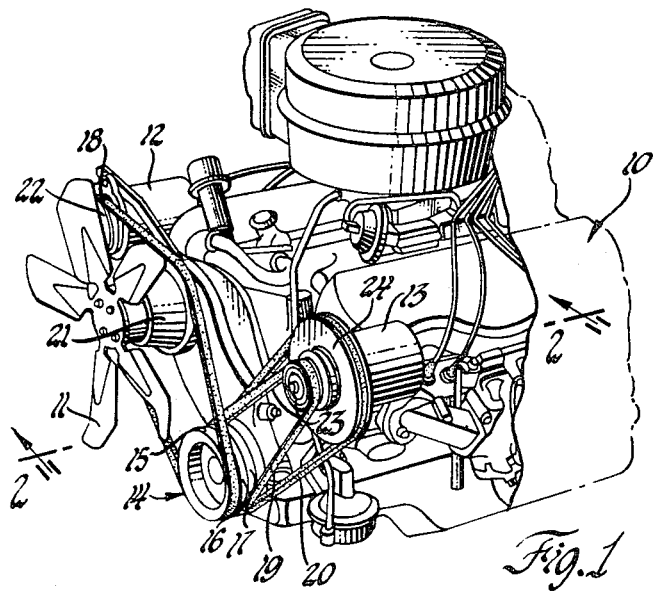
FIGURE 1 is a perspective view of an accessory drive arrangement constructed in accordance with the principles of this invention and assembled to a vehicle engine.
FIGURE 2 is a sectional view through the accessory drive pulley structure taken along the line 2—2 of FIGURE 1.
FIGURE 3 is a schematic diagram of a control system for controlling energization of the clutch coils of FIGURE 2.

Referring to FIGURE 1 there is shown a vehicle engine 10 together with a plurality of engine-driven accessories including a fan 11, a generator 12 and an air-conditioning compressor 13. An engine crankshaft driven pulley 14 is provided with pulley sheaves 15, 16, 17 for driving belts 18, 19, 20, respectively. Belt 18 may drive fan 11 and generator 12 through a fan pulley 21 and a generator drive pulley 22. Belt 19 rides in pulley sheave 16 and a relatively small diameter compressor pulley 23 and continuously drives pulley 23. Belt 20 rides in engine crankshaft pulley sheave 17 and continuously drives a relatively large diameter compressor pulley sheave 24. The engine driven crankshaft pulley sheaves 15, 16, 17 are preferably all the same diameter which preferably is 7 inches. Compressor drive pulley sheave 23 is preferably 3½ inches in diameter while compressor drive pulley sheave 24 is preferably 10 inches in diameter.

Referring to FIGURE 2, compressor 13 includes a compressor housing 25 which may be bolted to a housing support 27 by a bolt 26. An axially extending annular support boss 28 on housing 25 extends into the hub of pulley 24. A bushing 29 supports the pulley 24 for rotation upon boss 28 and a washer 30 is disposed between one side of pulley 24 and housing portion 31. A compressor drive shaft 45 extends outwardly from housing 13 and is supported for rotation by a bearing 32 disposed between annular boss 28 and shaft 45. A double-ended electromagnetic clutch 33 includes a magnet support housing 34 keyed for rotation with shaft 45 by a key 44 and spaced electromagnetic coils 35 and 36 electrically insulated from each other by suitable insulation 37 disposed in annular chambers in housing 33. Housing 34 is shaped to provide an axially extending pulley support boss 38 for receiving pulley 23 and a bushing 39. Pulley 23 rides on bushing 39 and is retained in assembled relationship on boss 38 by means of a washer 40 disposed adjacent the end of boss 38 and a nut 41 screw-threaded on the end of compressor drive shaft 45. It will readily be apparent that pulley 24 is freely rotatable with and axially movable with respect to housing support flange 28 and that pulley 23 is freely rotatable and axially movable with respect to magnet housing support flange 38. It will further be apparent that in the event that neither electromagnet is energized both pulleys will spin freely and compressor drive shaft 45 will not be driven. In the event that electromagnet 35 is energized pulley 23 will move axially on boss 38 to place friction contact surface 46 of pulley 23 into contact with contact surface 47 of housing 34 to thereby drive shaft 45 through housing 34. In the event that electromagnet 36 is energized pulley 24 will move axially on boss 28 to place contact surface 48 of pulley 24 into friction contact with contact surface 49 of housing 34 to thereby drive shaft 45 through housing 34.

Referring to FIGURE 3 there is shown a schematic diagram of a control system for controlling the double-ended clutch. An electrical source such a a battery 50 grounded at 51 may be connected to a governor-controlled switch 55 through a manually controlled switch 53 and power lines 52, 54. Electromagnets 35 are connected to a switch contact 56 by a power line 57 and is grounded at 58. Electromagnet 36 is connected to a switch contact 59 by a power line 60 and is grounded at 61. An engine driven governor 62 may be driven from the engine by a governor drive shaft 63. At engine speeds below a predetermined engine speed switch 55 will contact switch terminal 56. At speeds above a predetermined engine speed flyweights 64 will move against a spring (not shown) to move a collar 65 connected to switch 55 through a link 67 to position switch 55 in contact with contact 59.

It will be apparent that with switch 53 open neither coil 35 or 36 will be energized. Pulleys 23 and 24 will be driven by their respective belts but will spin freely on bushings 39 and 29 respectively. Compressor drive shaft 45 will be stationary. In the event that air-conditioning is desired switch 53 will be moved into contact with contact 53a to energize power line 54. If the engine speed is below a predetermined speed governor 62 will position switch 55 in contact with switch contact 56 to energize power line 57 and coil 35. Pulley 23 will be held in non-rotatable relationship with respect to housing 34 and will drive housing 34 and shaft 45 at a relatively high speed with respect to engine speed. At speeds above a predetermined engine speed governor 62 will place switch 55 in contact with switch contact 59 to deenergize coil 35 and energize coil 36 through power line 60. Housing 34 and compressor drive shaft 45 will be driven at a lower speed relative to engine speed by pulley 24.

With an engine crankshaft driven pulley 14 of seven inch diameter, with pulley 23 having a diameter of 3½ inches and with pulley 24 ten inches in diameter, the relationship of compressor drive shaft speed to engine speed may be controlled to obtain compressor speeds sufficient to provide adequate cooling capacity throughout a relatively low speed range of engine speeds and also throughout a relatively high speed range of engine speeds and yet avoid excess compressor capacity in the relatively high speed range of engine speeds. If the relatively low speed range of engine speeds is considered to be from 500 r.p.m. (engine idle) to 1300 r.p.m. drive through pulleys 14 and 23 will result in compressor speeds which are twice engine speed. Thus, at 500 r.p.m. engine speed compressor speed will be 1000 r.p.m., and at 1300 engine r.p.m. compressor speed will be 2600 r.p.m.

At 1400 engine r.p.m. governor 62 automatically establishes compressor drive by way of pulleys 14 and 24. The relationship of engine r.p.m. and compressor speed in the relatively high engine speed range is set forth in the following table.

| Engine r.p.m. | Compressor r.p.m. |
| --- | --- |
| 1400 | 980 |
| 1500 | 1050 |
| 1600 | 1120 |
| 1700 | 1190 |
| 1800 | 1260 |
| 1900 | 1330 |
| 2000 | 1400 |
| 2500 | 1750 |
| 3000 | 2100 |
| 3500 | 2450 |
| 4000 | 2800 |

The arrangement of the housing 34 with the magnetic coils at opposite ends of the housing results in a compact inexpensive multiple-speed compressor drive which is simple to assemble and manufacture in large scale production. The drive arrangement makes possible continued use of conventional compressors without any compressor changes and at the same time greatly increases the useful compressor life by reducing the maximum speeds at which the compressor is driven. Improved compressor performance is obtained in the relatively low speed ranges of engine speed by driving the compressor at speeds relative to engine speed wherein the compressor is capable of providing adequate cooling capacity for desirable cooling effect. When operating in the relatively high speed range of engine speed, the compressor speed relative to engine speed is reduced to minimize fuel consumption required to drive the compressor, to increase useful compressor life by avoiding excess compressor speeds and at the same time the compressor is driven at speeds adequate to meet cooling requirements. As compared to conventional air-conditioning compressor drives commonly used in automotive vehicles the compressor speed is higher at low engine speeds and lower at high engine speeds. Compressor life is prolonged and compressor efficiency is increased. The additional space needed is minimal. The magnetic clutches are reliable and installation costs are minor. If desired, release springs (not shown) may be employed to bias each pulley axially on its support in order that the deenergized pulley will move axially when deenergized to provide proper clearance between mating faces of the pulley and its related coil face. It is also important that governor 62 be engine driven rather than compressor speed responsive in order to prevent "hunting" between drive ratios at the engine speed at which transition of ratio is had. Housing 34 is fixed against axial movement by abutment at one end with boss 29 and by abutment of boss 38 with washer 40. If coil 35 is energized pulley 23 will move axially on bushing 39 into contact with housing 34 at the end of the housing 34 adjacent coil 35. If coil 36 is energized pulley 24 will move axially on bushing 29 into contact with clutch housing 34 adjacent coil 36. The contact surface 46 of pulley 33 will engage contact surface 47 of clutch housing 34 when coil 35 is energized. The contact surface 48 of pulley 24 will engage contact surface 49 of housing 34 when coil 36 is energized. The drive of housing 34 is by alternate friction contact with pulleys 23 and 24 upon energization of coils 35 and 36. The arrangement of the drive structure is very compact and makes possible improved performance of conventional compressors without modification of the compressor.

What is claimed is:

1. An accessory drive for an engine-drive accessory comprising an engine-driven pulley having a pair of drive sheaves formed thereon, an accessory housing containing an accessory adapted to be driven, an accessory drive shaft for driving said accessory extending outwardly from said accessory housing, an axially extending hollow boss on said accessory housing, said accessory drive shaft extending through said boss, a clutch housing fixed for rotation with said accessory drive shaft and disposed axially adjacent said accessory housing boss, an axially extending boss on said clutch housing, said accessory drive shaft extending through said clutch housing boss, a first driven pulley supported for free rotation on said clutch housing boss and axially movable relative to said boss, a second driven pulley supported upon siad accessory boss and freely rotatable relative to said clutch housing, belting between said drive sheaves and driven pulleys, respectively, a first electromagnetic coil carried by said clutch housing and disposed adjacent said first driven pulley, a second electromagnetic coil carried by said clutch housing and disposed adjacent said second driven pulley, said electromagnetic coils, when energized, being effective to move said driven pulleys, respectively into contact with said clutch housing to drive said housing and accessory drive shaft, a power source adapted to be connected to said coils to energize the same, and means for controlling the energization of said coils including a switch controlled by an engine-driven governor, said switch being effective at engine speeds below a predetermnied engine speed to energize said first coil and effective at speeds above said predetermined engine speed to energize said second coil.

2. An accessory drive as set forth in claim 1 including a bushing disposed between the hub of said first driven pulley and said clutch housing boss.

3. An accessory drive as set forth in claim 1 including a bushing disposed between the hub of said second driven pulley and said accessory housing boss.

4. An accessory drive as set forth in claim 1 including a bearing disposed between siad accessory drive shaft and said accessory housing boss.

5. An accessory drive as set forth in claim 4 including a bushing disposed between the hub of said second driven pulley and said accessory housing boss and a thrust washer disposed between said second driven pulley and said accessory driven housing.

References Cited

UNITED STATES PATENTS

| 2,224,254 | 12/1940 | Cotal. |
| 2,762,229 | 9/1956 | Coning et al. |
| 2,825,233 | 3/1958 | Jacobs. |
| 2,851,865 | 9/1958 | Jacobs _____ 74—217 XR |

JULIUS E. WEST, *Primary Examiner.*

ALLAN D. HERRMANN, *Assistant Examiner.*

U.S. Cl. X.R.

192—48.2, 84, 103; 62—323